(12) United States Patent
Weiss et al.

(10) Patent No.: US 8,091,175 B2
(45) Date of Patent: Jan. 10, 2012

(54) BEARING DEVICE

(75) Inventors: Manfred Weiss, Haunersdorf (DE); Walter Schiffler, Dingolfing (DE)

(73) Assignees: Edscha Cabrio-Dachsysteme GmbH, Hengersberg (DE); Bayerische Motoren Werke AG, Munich (DE)

( * ) Notice: Subject to any disclaimer, the term of this patent is extended or adjusted under 35 U.S.C. 154(b) by 156 days.

(21) Appl. No.: 11/879,864

(22) Filed: Jul. 18, 2007

(65) Prior Publication Data
US 2008/0047095 A1    Feb. 28, 2008

(30) Foreign Application Priority Data

Jul. 18, 2006  (DE) .......................... 10 2006 033 608

(51) Int. Cl.
*F16L 5/00*  (2006.01)
(52) U.S. Cl. .......................................... 16/2.1
(58) Field of Classification Search ............. 16/2.1, 16/2.3; 384/276, 295, 296, 41, 439; 403/278–283; 29/898.054, 898.056, 898.07, 451, 34 R, 29/22, 432.1–432.2; 411/29, 30, 501, 31, 411/446, 451.3, 180
See application file for complete search history.

(56) References Cited

U.S. PATENT DOCUMENTS

| | | | | |
|---|---|---|---|---|
| 1,861,814 A * | 6/1932 | Peters | ...................... | 403/281 |
| 3,204,284 A * | 9/1965 | Merriman | ...................... | 16/2.1 |
| 3,563,183 A * | 2/1971 | Rich | ...................... | 108/57.31 |
| 4,435,100 A * | 3/1984 | Cox | ...................... | 403/27 |
| 4,494,883 A * | 1/1985 | Winter | ...................... | 384/439 |
| 5,069,586 A * | 12/1991 | Casey | ...................... | 411/339 |
| 5,385,422 A * | 1/1995 | Kruger | ...................... | 403/371 |
| 5,447,400 A * | 9/1995 | Seymour | ...................... | 411/29 |
| 5,685,659 A * | 11/1997 | Brosius et al. | ...................... | 403/65 |
| 5,730,262 A * | 3/1998 | Rucks et al. | ...................... | 188/321.11 |
| 5,735,021 A * | 4/1998 | Briggs | ...................... | 16/369 |
| 6,061,870 A * | 5/2000 | Dodge et al. | ...................... | 16/2.1 |
| 6,374,455 B1 * | 4/2002 | Regele et al. | ...................... | 16/2.1 |
| 6,942,387 B2 | 9/2005 | Janz | ...................... | 384/129 |
| 7,010,845 B2 * | 3/2006 | Muller et al. | ...................... | 29/512 |

(Continued)

FOREIGN PATENT DOCUMENTS

DE          197 17 114          10/1998

(Continued)

*Primary Examiner* — Victor Batson
*Assistant Examiner* — Matthew Sullivan
(74) *Attorney, Agent, or Firm* — Davidson, Davidson & Kappel, LLC

(57) ABSTRACT

A bearing device comprising: an at least partially hollow structural element having a first wall region provided with an opening and a second wall region, the first and second wall regions being located opposite one another; and a punching bushing provided for bearing at least one separate component, the punching bushing comprising a punching blade being in jam contact with a punched out opening of the second wall region such that the punching bushing connects the first and second wall regions. A method of producing a bearing device, the method comprising the steps of: providing an at least partially hollow structural element having a first wall region, provided with an opening, and a second wall region, the first and second wall regions being located opposite one another; introducing into the opening of the first wall region a punching bushing being provided for bearing a separate component; and displacing the punching bushing in a direction of the second wall region in order to punch out part of the second wall region coaxially in relation to the opening of the first wall region such that the first wall region and the second wall region are connected by the punching bushing.

22 Claims, 8 Drawing Sheets

U.S. PATENT DOCUMENTS

| | | | |
|---|---|---|---|
| 7,334,958 B2 * | 2/2008 | Muller et al. | 403/168 |
| 7,594,788 B2 * | 9/2009 | Maloney | 411/180 |
| 2002/0104187 A1 * | 8/2002 | Kakamu et al. | 16/2.1 |
| 2005/0097722 A1 * | 5/2005 | Muller et al. | 29/525.06 |
| 2006/0107491 A1 | 5/2006 | Dalum | 16/355 |
| 2006/0177285 A1 * | 8/2006 | Maloney | 411/501 |
| 2007/0192993 A1 * | 8/2007 | Selle | 16/273 |
| 2008/0148544 A1 * | 6/2008 | Shuart et al. | 29/509 |

FOREIGN PATENT DOCUMENTS

| | | |
|---|---|---|
| DE | 203 20 931 | 6/2005 |
| EP | 1 315 911 | 6/2003 |

\* cited by examiner

BEARING DEVICE

Priority is claimed to German Patent Application 10,2006, 033,608.9-12, filed on Jul. 18, 2006, the entire disclosure of which is incorporated by reference herein.

BACKGROUND OF THE INVENTION

The present invention relates to a bearing device. More particularly, the present invention relates to a bearing device with a partially hollow structural element.

Conventional pivot bearing devices and insert parts intended therefore are shown, for example, in DE 197 17 114 A1 and EP 1 315 911 B1.

It is known for a respective bearing bushing to be fastened on the opposite wall regions of tubular components in order thus to form a bearing location. For jamming-free pivoting of a bearing bolt or the like, which is accommodated in a rotatable manner in the bearing bushings in order to bear a separate component, it is imperative for the two bearing bushings to be precisely coaxial, but this requires a complex and thus costly production operation.

For tubular components, pivot bearing devices in which bearing bushings or the like are fastened in or on the tubular components by welding are known. Weld connections are usually costly to produce and, on account of the heat introduced, result in disadvantageous warping and in weakening of the tubular structural element.

Furthermore, in particular when forming by internal high pressure, weld connections may result in a decrease in the work-hardening produced by the forming operation. In the event of warping occurring as a result of the quantity of heat introduced, costly correcting operations are usually necessary in order to compensate for the warping. Furthermore, the operation of introducing two openings or through-passages in the tubular component in the necessary coaxial arrangement, these openings or through-passages being necessary if the component is to have a bearing location which passes right through it, is very complex, and thus costly, in production terms.

SUMMARY OF THE INVENTION

An object of the present invention is to provide a bearing device which is easy to produce and provides for a high level of bearing accuracy.

A bearing device according to a preferred embodiment of the present invention comprises an at least partially hollow structural element which has a first wall region, provided with an opening, and a second wall region the first and the second wall regions being located opposite one another. The bearing device further comprises a punching bushing which is provided for bearing at least one separate component. The punching bushing comprises a punching blade being in jam contact with a punched out opening of the second wall region such that the punching bushing connects the first and second wall regions. The punching bushing can be displaced longitudinally, along its longitudinal axis, in the opening of the first wall region. By virtue of the punching bushing being displaced within this opening, it can be brought into contact at its distal end with the second wall region in its order to punch out part of the second wall region coaxially in relation to the opening of the first wall region, in which case the punching bushing connects the first and second wall regions to one another.

A partially hollow structural element is understood, according to a preferred embodiment of the present invention, as one which has two opposite wall regions which are spaced apart from one another and form a cavity between them. Such a hollow structural element may be, for example, a tubular part which is produced as an extruded component or as a hydroformed component (using hydroforming, for example). It is also possible, for example, for the partially hollow structural element to be formed by a carrier plate with a leg welded, or fastened in some other suitable manner, on each peripheral side. For example, if the two legs on the carrier plate are fitted essentially at right angles to the surface of the latter, and essentially parallel to one another, in which case the carrier plate and the two legs constitute a U-profile, the two legs form the abovementioned first and second wall regions. It is generally not necessary for the partially hollow structural element to be of cross-sectionally closed configuration along its longitudinal axis.

The two wall regions of the structural element may be connected by virtue of the punching bushing being displaced longitudinally in the direction of the second wall region and of part of the second wall region then being punched out, coaxially in relation to the opening of the first wall region, by means of a punching blade formed on the distal end of the punching bushing. Following the punching-out operation, the distal end of the punching bushing, as a result of surface pressure, may be in firm contact with the remainder of the second wall region. It is possible for the punching bushing, adjacent to its punching blade, to have a depression with an undercut, preferably along its circumference. If the punching bushing is connected to the second wall region by means of its punching blade, a material of the second wall region may penetrate into the depression along the circumference of the punching bushing and engages in the undercut. In addition to the abovementioned surface pressure, this may result in a form fit between the punching blade and the second wall region, providing for the punching bushing being secured against a release, i.e. against being pulled out of the second wall region and/or out of the structural element.

The punching bushing may form a pivot bearing device which is fixed to the structural element of the bearing device. By virtue of the two wall regions being connected by means of the punching bushing, the structural element may be advantageously stiffened in the region of its cavity. Furthermore, the operation of the second wall region being punched out by the punching bushing generally eliminates the need for welding, as a result of which the situation where heat is introduced into the structural element is avoided. This means that no warping or other heat-induced factors may occur as a result of heat being introduced. On account of welding operations being eliminated, it may be also possible to eliminate additional corrosion-protection measures for the assembly as a whole, i.e. the bearing device with punching bushing fastened on the structural element. This may not affect the fact that the individual parts of the bearing device may be subjected to separate corrosion-protection treatment prior to being joined together.

The opening which is punched out in the second wall region by means of the punching bushing may be advantageously precisely coaxial with the opening which is formed in the first wall region. This generally helps to increase the component accuracy, which generally results in functional improvements for kinematic components, with the production sequence generally being simplified at the same time. In addition, the openings provided in the structural element constituting a basic part of the bearing device according to a preferred embodiment of the invention may be reduced to a minimum, thus eliminating unnecessary weakening of the structural element.

The opening of the first wall region may advantageously have a collar along its circumference, this collar improving the longitudinal displaceability of the punching bushing along its longitudinal axis. This generally prevents the punching bushing from tilting or the like during displacement in the direction of the second wall region. Furthermore, this may also result in one distal end of the punching bushing being positioned on the second wall region precisely coaxially in relation to the opening of the first wall region in order to punch out the part of the second wall region, and thus also to connect the punching bushing to the second wall region. The collar may have the further function, when the punching bushing is fitted, of distributing over a larger surface area the forces which act radially on the punching bushing. This may be advantageous, in particular, if use is made of materials of low compressive strength. By virtue of the abovementioned collar being provided, the punching bushing may be retained in corresponding openings in the first wall region and in the second wall region, which openings may be arranged precisely coaxially in relation to one another. This accuracy may be achieved in a straight-forward manner by the abovementioned punching operation, generally without use having to be made of complex and costly measuring gauges or the like.

The opening in the first wall region may serve as a guide or centering means for the displacement of the punching bushing in the direction of the second wall region, in order to achieve the precisely coaxial arrangement mentioned above. The bearing device according to a preferred embodiment of the present invention may provide the possibility of double-sided mounting in a tubular structural element, of at least partially hollow configuration, beyond two tube walls, increased accuracy of the two necessary through-passages in the wall regions of the structural element being achieved.

The bearing device according to a preferred embodiment of the present invention may be suitable, in particular, in the case of tubular elements of comparatively thin wall cross section since the connection of the two wall regions by the punching bushing may advantageously reduce the surface pressure with respect of the wall regions of the structural element.

In a preferred embodiment of the present invention, the collar, which may be provided on the opening of the first wall region, may be formed on the inside of this opening. This may reduce, or eliminate altogether, the risk of injury when handling the structural element since the inwardly projecting collar may generally not accessible from the outside. Furthermore, a punching-bushing periphery with a diameter greater than the nominal diameter of the punching bushing may rest flush on a peripheral surface of the first wall region without projecting outward from the structural element. This may also considerably reduce the risk of injury. It is likewise advantageous if the length of the punching bushing is essentially coordinated with the width of the cavity between the first and the second wall regions of the structural element, with the result that the punching bushing may not disadvantageously project out of the structural element.

The punching bushing may be advantageously produced as a turned part, if only small numbers are necessary, for example. In this case, the punching-bushing periphery of relatively large diameter may be formed by cutting. As an alternative, if large numbers are required, it also may be possible to produce the punching bushing as an extrusion.

In a preferred embodiment of the present invention, the separate component may be retained in a rotatably mounted manner on the punching bushing by means of a fastening element, in which case the separate component and the fastening element may be consequently pivoted relative to one another. The separate component being mounted on the punching bushing by means of a fastening element provides for that both the component and the structural element may be of simple structural design. It may be advantageous here if a longitudinal axis of the fastening element and/or longitudinal axis of the punching bushing define/defines a pivot axis for the component.

In a preferred embodiment of the present invention, the punching bushing may be configured to be hollow along its longitudinal axis. This may allow for straight-forward fastening of the fastening element on the punching bushing. Whenever the fastening element and the punching bushing are moved relative to one another, a sliding-bearing bushing with an essentially cylindrical inner surface may be advantageously introduced into the punching bushing. The fastening element, fastened on the component, may then be mounted in a rotatable manner within the sliding-bearing bushing, resulting in low-friction pivoting of the separate component in relation to the structural element of the bearing device. The sliding-bearing bushing may be produced, for example, from a metal body which is coated with a plastic material having a low coefficient of friction. It also may be possible for the sliding-bearing bushing to be produced entirely from a special plastic material having a low coefficient of friction.

In a preferred embodiment of the present invention, the sliding-bearing bushing may have a first peripheral region, of which the external diameter is larger than the internal diameter of the punching bushing. It thus may be possible for the sliding-bearing bushing to be introduced into the cavity of the punching bushing from the outside until the first peripheral region of the sliding bushing is positioned against the periphery of the punching bushing. This may automatically establish precise positioning of the sliding-bearing bushing within the punching bushing.

In a preferred embodiment of the present invention, the sliding-bearing bushing may have, opposite the first peripheral region, a second peripheral region, of which the external diameter may be adapted to the internal diameter of the punching bushing, or the cavity thereof, such that the sliding-bearing bushing may be inserted into the punching bushing with the second peripheral region in front. The length of the punching bushing here may be dimensioned such that, once the sliding-bearing bushing has been inserted into the punching bushing, the second peripheral region of the sliding-bearing bushing may project out of the opposite end of the punching bushing, in which case the second peripheral region may be flanged. Following flanging of the second peripheral region, the sliding-bearing bushing may be secured against sliding out of the punching bushing.

In a preferred embodiment of the present invention, the sliding-bearing bushing may be designed in three parts. A central part of the sliding-bearing bushing may be designed in the form of a cylindrical sleeve, preferably made of plastic material, the two peripheral parts, adjacent to the sleeve, each being designed as so called thrust plates. In particular, the thrust plates, which may have a larger diameter than the nominal diameter of the sleeve, may be expediently produced from a low friction plastic material. It also may be possible to have thrust plates made of metal which, on at least the surface which is in contact with the adjacent punching bushing, may be coated with material having a low coefficient of friction.

In a preferred embodiment of the present invention, it also may be possible for the inner circumferential surface of the punching bushing to be coated with a material having a low coefficient of friction. This may achieve the same effect as that achieved by a sliding-bearing bushing, namely that the fastening element, which may be guided through the punching bushing along the length of the latter, may be rotated relative to the punching bushing with as little friction as possible when the separate component pivots in relation to the structural element. I It also may be possible for an outer circumferential surface of the fastening element to be coated with a material having a low coefficient of friction, which may achieve the same effect as has already been explained above.

In a preferred embodiment of the present invention, the fastening element may be formed from a rivet, a screw, a bolt or the like, for example. The fastening element may be guided all the way through the cavity of the punching bushing and/or of the sliding-bearing bushing and may serve for bearing the separate component in relation to the structural element.

In a preferred embodiment of the present invention, at least one end of the punching bushing may have an internal thread into which the fastening element, in particular in the form of a screw or the like, can be screwed from an outer side of the structural element. The separate component may be mounted in a rotatable manner on the screw. For this purpose, the component may contain a through-hole, through which the screw may pass. The component thus may be mounted in a rotatable manner on the screw. An outer circumferential region of the screw and/or at least part of the inner circumferential surface of the through-hole of the component may be coated with a material having a low coefficient of friction to assist in providing jamming-free and failure-free pivoting of the component on the screw.

In a preferred embodiment of the present invention, the separate component may be retained in a rotatably mounted manner on an outer surface of the first wall region and/or of the second wall region. It may be particularly expedient if the separate component is designed as a so-called link component with two link arms which accommodate the structural element between them. The link arms may be thus each retained in a rotatably mounted manner on an outer side of the first and of the second wall region, in which case the structural element may be accommodated between the first and the second wall regions. The separate component, which may be in the form of a link component, may be fitted on the structural element in a straight-forward and efficient manner, and with a high level of operational reliability, by means of the fastening element which may be in the form of a rivet or the like and which may extend through the cavity of the punching bushing and/or of the sliding-bearing bushing.

It also may be possible for two separate components to be mounted on the structural element.

In a preferred embodiment of the present invention, a sliding-bearing bushing may be fitted on an outer circumference of the punching bushing and the separate component may be mounted between the first and the second wall regions. An end surface of the structural element may be designed to be open. During pivoting in relation to the structural element, the separate component may then be in sliding contact with the sliding-bearing bushing, which may thus result in jamming-free pivoting and a low level of wear to the respective frictional surfaces. It also may be possible for the punching bushing itself to be coated with a material with a low coefficient of friction on its outer circumferential surface, in which case the separate component, if it is mounted on the punching bushing, may be in sliding contact with this coating.

A method of producing a bearing device according to a preferred embodiment of the present invention comprises the following steps: providing an at least partially hollow structural element having a first wall region, provided with an opening, and a second wall region, the first and second wall regions being located opposite one another; introducing into the opening of the first wall region a punching bushing which is provided for bearing a separate component; and displacing the punching bushing in the direction of the second wall region in order to punch out part of the second wall region coaxially in relation to the opening of the first wall region, in which case the first and the second wall regions are connected by the punching bushing.

By virtue of part of the second wall region being punched out by the punching bushing, the two wall regions of the structural element may be advantageously connected to one another, resulting in the cross-section of the structural element being stiffened and in an increased level of component accuracy. A significant advantage of this method is that the punching bushing, which may serve as a bearing location or pivot bearing for a separate component, may be fastened on the structural element by other means than welding, in which case the situation where heat is introduced into the structural element may be avoided. Other advantages of the method according to the present invention correspond to those of the corresponding device according to the present invention as already explained above.

Further advantages and configurations of the invention may be ascertained from the description and the accompanying drawings. The features of the present invention may vary from the examples and preferred embodiments herein explained and/or be used in other combinations or on their own without departing from the framework of the present invention.

BRIEF DESCRIPTION OF THE DRAWINGS

The present invention will be described and explained in more detail herein below with reference to an exemplary preferred embodiment of the bearing device according to the present invention and with reference to the attached drawings, in which.

DETAILED DESCRIPTION OF THE DRAWINGS

Figure 1:
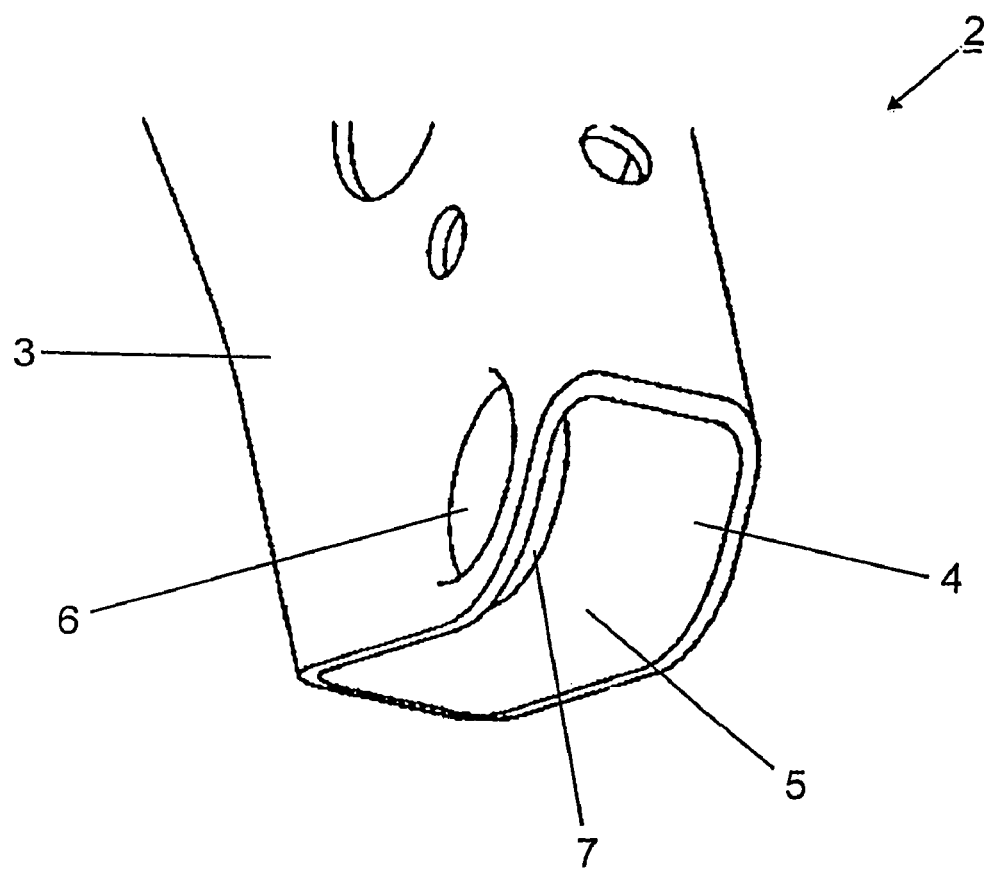
FIG. 1 shows a perspective view of part of an at least partially hollow structural element.
Figure 2:
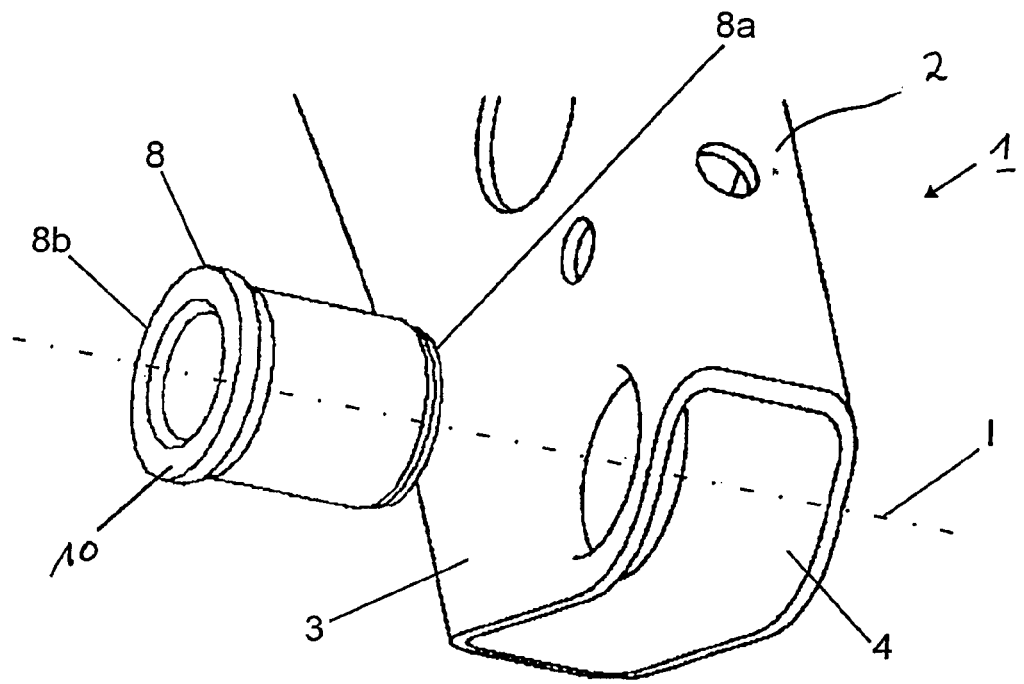
FIG. 2 shows a punching bushing being introduced into a lateral opening of the structural element shown in FIG. 1.
Figure 3:
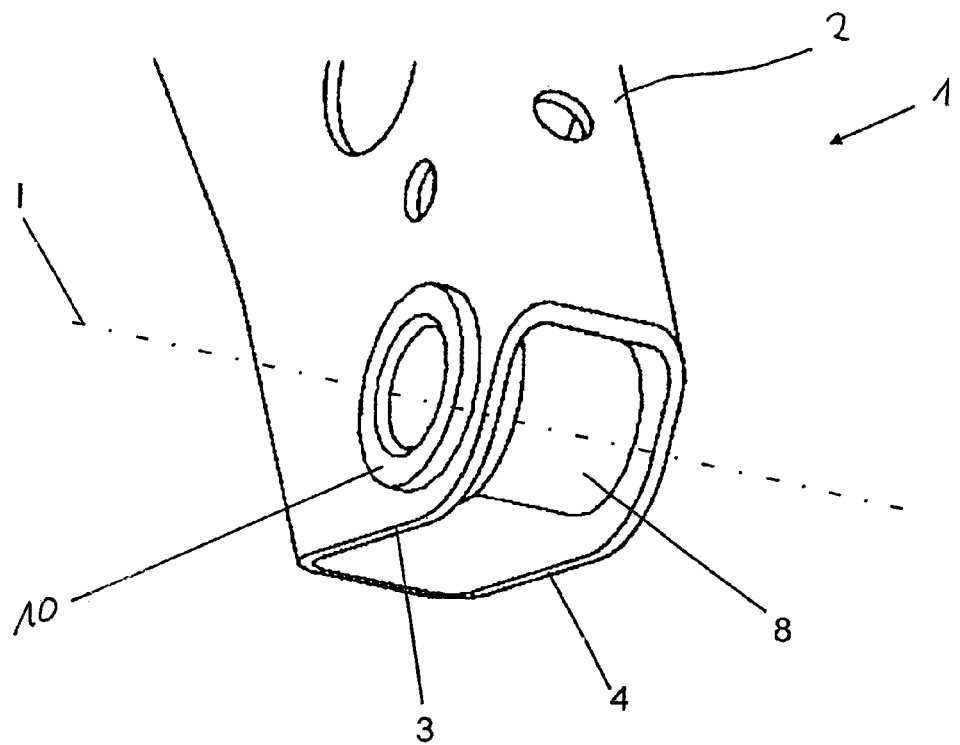
FIG. 3 shows a perspective view of a structural element with a punching bushing introduced therein.

FIG. 1 to 4 show individual parts of a bearing device 1 according to a preferred embodiment of the present invention as shown in FIG. 3.

The perspective view of FIG. 1 shows a structural element 2 which has a first wall region 3 and a second wall region 4. The structural element 2 is a tubular component and, accordingly, designed to be at least partially hollow. A cavity 5 of the structural element 2 is bound by the first wall region 3 and the second wall region 4.

The tubular structural element 2 can be produced, for example, as an extruded component or as a hydroformed component (using the "IHU technique", for example) of any desired cross section. In particular, the "IHU technique" may be distinguished in that it may be used to produce very lightweight and precise metal components of high strength.

A pivot bearing for bearing a separate component may be introduced into the structural element 2, as explained herein below.

Figure 6:
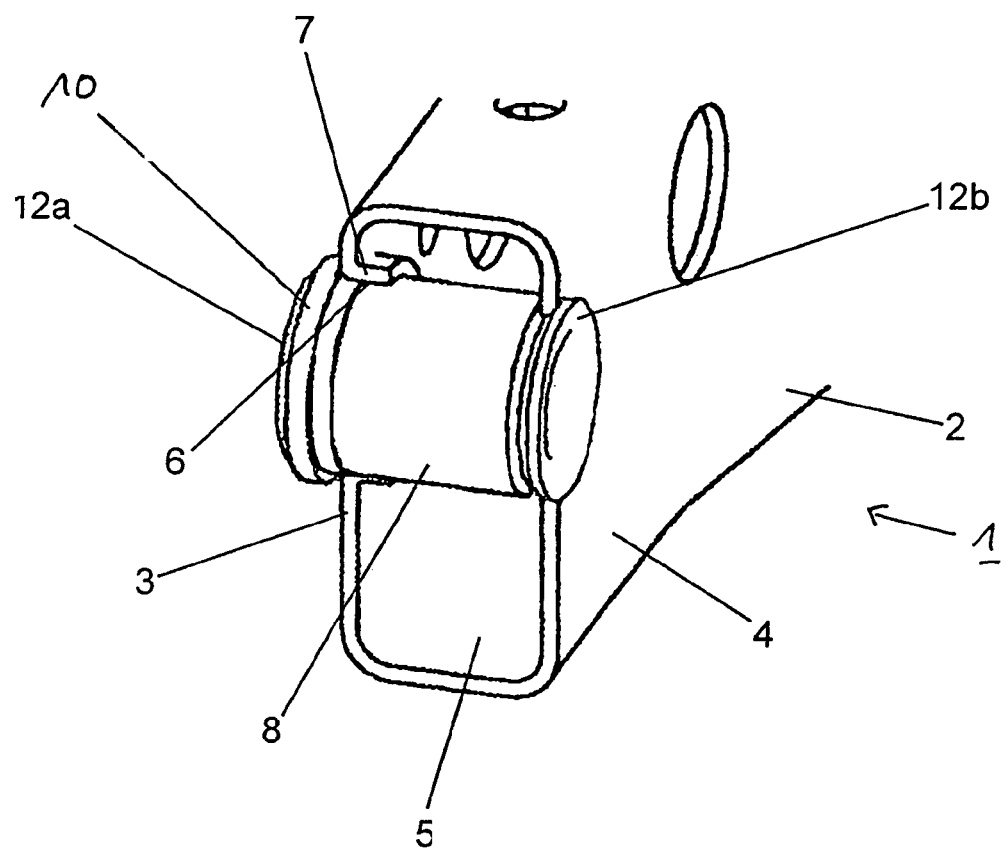
FIG. 6 shows the structural element shown in FIG. 5 in a cut-away perspective view, the punching bushing being shown in the closed state.

An opening 6 in the form of a round through-hole is formed in the first wall region 3 of the structural element 2. In the initial state of the structural element, the second wall region 4, in the first instance, has no opening formed opposite the opening 6. A collar 7 is formed along a circumference of the opening 6 and extends inward, i.e. into the cavity 5 (FIG. 6).

The bearing device 1 also may comprise a punching bushing 8 (FIG. 2), which is configured as a cylindrical hollow body. At its front end 8a, the punching bushing 8 has a punching blade 9. At its rear end 8b, the punching bushing 8 is provided with a periphery 10 of which the diameter is larger than the nominal diameter of the punching bushing. The periphery 10 performs essentially two functions, for example. On the one hand, it forms a defined abutment surface for the punching bushing on an outer surface of the first wall region 3 and also for the periphery of a sliding-bearing bushing 12 (FIG. 4), which is accommodated within the punching bushing 8. On the other hand, the periphery 10 provides a precise width for the bearing location since, by virtue of the periphery 10 butting against the outer surface of the first wall region 3, the punching bushing 8 can be positioned precisely with respect of the width of the structural element 2, i.e. between the first and the second wall regions 3, 4.

The operation of connecting the punching bushing 8 to the structural element 2 according to a preferred embodiment of the present invention, then, functions as follows:

The punching bushing 8 is introduced into the opening 6 with its front end 8a, i.e. with the punching blade 9, in front. The punching bushing 8 is then displaced within the opening 6, in the direction of the second wall region 4, along its longitudinal axis 1 (FIG. 2). The collar 7 along the circumference of the opening 6 here assists the longitudinal displacement of the punching bushing 8 along its longitudinal axis 1, in order to prevent tilting, jamming or the like, for example. The opening 6 and its collar 7 serve as a guide and a centering means, respectively, for the displacement of the punching bushing 8 in the direction of the second wall region 4.

As soon as the punching bushing 8 comes into contact with the second wall region 4 by way of its punching blade 9, the punching bushing 8 is pushed on further through the opening 6 by a force large enough in order to punch out part of the second wall region 4 coaxially in relation to the opening 6 of the first wall region 3. Once this part of the second wall region has been punched out, the punching blade 9 is in clamping contact with the remainder of the second wall region 4, in which case the first and the second wall regions 3, 4 are connected by the punching bushing 8. The punched-out part of the second wall region 4 can then readily be removed from the punching bushing 8.

An outer circumferential surface of the punching bushing 8 may be provided with knurling which, upon introduction into the opening of the first wall region, comes into contact with an inner surface of the collar. Knurling is to be understood as a profiling, on the outer circumferential surface of the punching bushing, which covers a diameter which is larger than the nominal diameter of the punching bushing. The knurling improves the connection and the fastening of the punching bushing 8 to the first wall region 3.

By virtue of part of the second wall region 4 being punched out, the punching bushing 8 can be fixed to the second wall region 4 without any welding or the like being necessary. This also means that the structural element is not subjected to any warping, which usually occurs during welding on account of the heat introduced. Since the opening 6 serves as a guide during displacement of the punching bushing along its longitudinal axis 1, the punching bushing 8 can be brought into contact with the second wall region 4, and connected thereto by the punching operation, precisely coaxially in relation to the opening 6. This does away with the need of providing the two wall regions 3, 4 from the outset with precisely coaxial openings to give the structural element a bearing location which passes all the way through. By virtue of the punching bushing 8 being punched into the second wall region 4, and of the punching bushing 8 remaining in the structural element 2 in order for a separate component to be mounted thereon, the production sequence for the bearing device 1 according to the invention is considerably simplified and rendered less costly. Adjacent to the punching blade 9, a depression (not shown) with an undercut may be formed on the outer circumferential surface of the punching bushing 8, in which case a material of the second wall region 4 penetrates into this undercut following the punching operation explained above. This rules out the punching bushing 8 from being released unintentionally from the second wall region 4. FIG. 3 shows a perspective view of the structural element 2, with the punching bushing 8 introduced therein, following completion of the punching operation. In this case, the periphery 10 at the rear end 8b of the punching bushing 8 is in contact with an outer surface of the first wall region 3. This also gives rise to defined seating of the punching bushing within the structural element 2. Furthermore, a length of the punching bushing is coordinated with the width of the cavity 5, or with the spacing between the two wall regions 3, 4, which prevents the punching bushing from disadvantageously projecting out of the structural element.

As explained above, the punching bushing 8 is designed as a hollow body according to a preferred embodiment of the present invention. It is thus possible for a separate component 11 (FIG. 7) simply to be mounted on the punching bushing by a fastening element, for example in the form of a rivet, being fastened on the separate component and being guided through the cavity of the punching bushing 8. If the rivet and the punching bushing are moved relative to one another, it is preferential to use a sliding-bearing bushing, in which the rivet is mounted.

Figure 4:
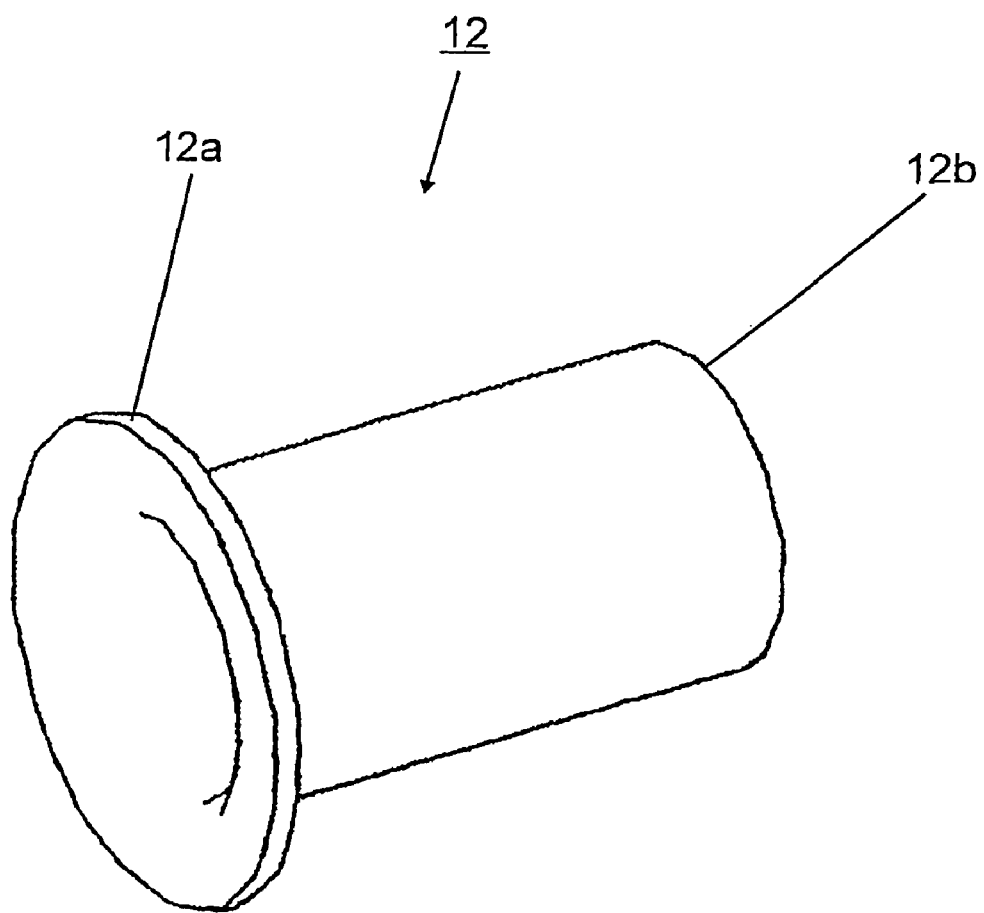
FIG. 4 shows a perspective view of a sliding-bearing bushing.

FIG. 4 shows a perspective view of such a sliding-bearing bushing 12, according to a preferred embodiment of the present invention. The sliding-bearing bushing 12, adapted to the punching bushing 8, is likewise designed as a cylindrical hollow body, an external diameter of the sliding-bearing bushing 12 being adapted to the internal diameter of the punching bushing 8. The sliding-bearing bushing 12 can thus be plugged into the punching bushing 8. The sliding-bearing bushing 12 has a first peripheral region 12a, of which the diameter is larger than the nominal diameter of the sliding-bearing bushing. In other words, the diameter of the periphery 12a is larger than the internal diameter of the punching bushing 8. In an initial state of the sliding-bearing bushing 12, this state being shown in FIG. 4, the second peripheral region 12b, which is opposite the first peripheral region 12a, is not, in the first instance, flanged, and the diameter of the second peripheral region 12b thus corresponds to the external diameter of the main body of the sliding-bearing bushing.

Figure 5:
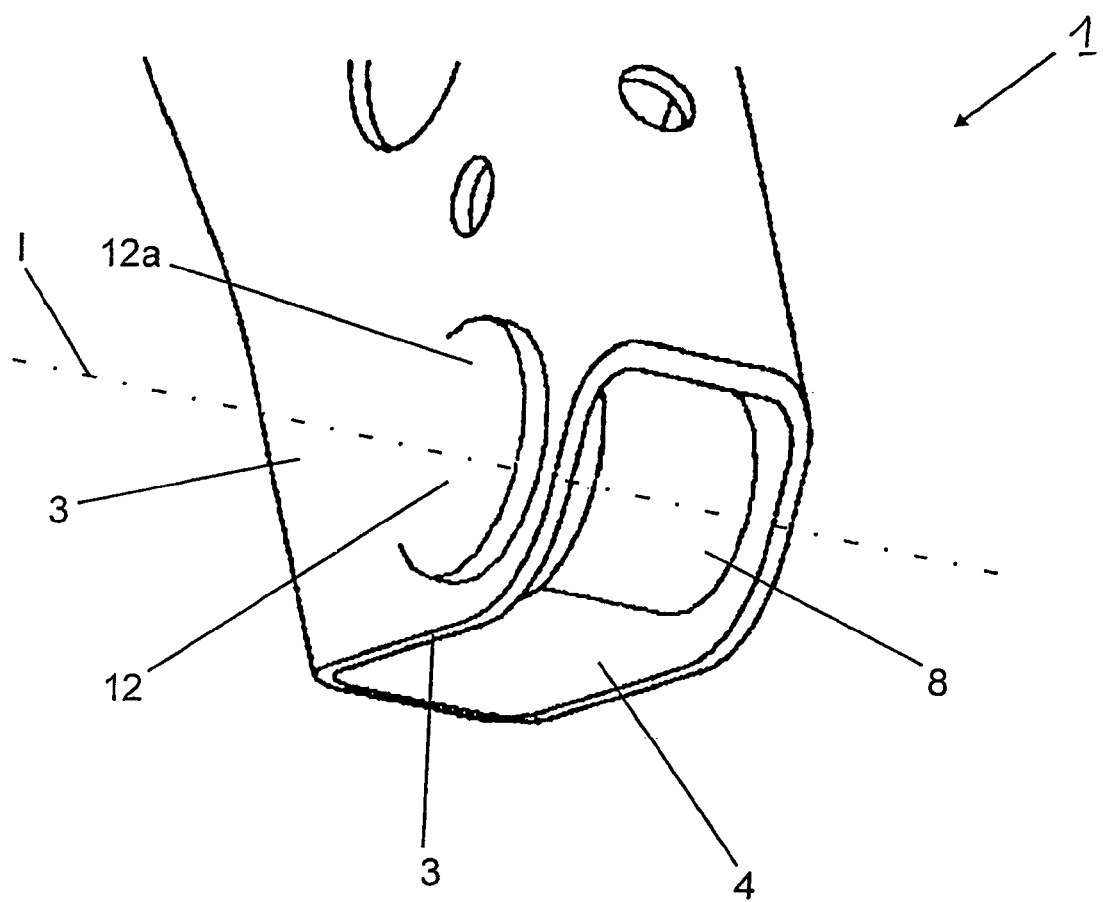
FIG. 5 shows a perspective view of the structural element shown in FIG. 3, the sliding-bearing bushing from FIG. 4 having been introduced into the punching bushing.

An explanation will be given herein below, with reference to FIGS. 5 and 6, of how the sliding-bearing bushing 12 can be connected to the punching bushing 8, according to a preferred embodiment of the present invention.

The sliding-bearing bushing 12 may be introduced into the punching bushing 8 with its second peripheral region 12b in front. In other words, the sliding-bearing bushing 12 is plugged through the punching bushing 8, along the longitudinal axis 1 thereof, with its second peripheral region 12b in front until the first peripheral region 12a strikes against a periphery of the punching bushing 8. The sliding-bearing bushing 12 is longer than the punching bushing 8, in which case, when the flanged, first peripheral region 12a strikes against the punching bushing 8, the second peripheral region 12b projects out of the punching bushing 8 on the opposite side. As is shown in the perspective view of FIG. 6, the second peripheral region 12b of the sliding-bearing bushing 12 can be flanged on following introduction into the punching bushing 8, in which case the sliding-bearing bushing 12 is retained in captive fashion in the punching bushing 8.

The sliding-bearing bushing 12 may be produced from a basic body made of steel, for example, with an inner surface of the sliding-bearing bushing being coated with a plastic material having a low coefficient of friction. I It is also possible for the sliding-bearing bushing to be produced entirely of a special plastic material with a low coefficient of friction, for example PTFE. In addition, or as an alternative, to flanging the second peripheral region 12b, the external diameter of the sliding-bearing bushing 12 and the internal diameter of the punching bushing 8 may be coordinated with one another to give a tight fit, in which case, once the sliding-bearing bushing 12 has been plugged into the punching bushing 8, it is not possible for the sliding-bearing bushing 12 to be rotated within the punching bushing 8 about the longitudinal axis 1 thereof.

The perspective view of FIG. 6 clearly shows the collar 7, which is formed on the periphery of the opening 6 and extends into the cavity 5, according to a preferred embodiment of the present invention. The collar 7 may assist guided longitudinal displacement of the punching bushing 8 within the opening 6.

Figure 7:
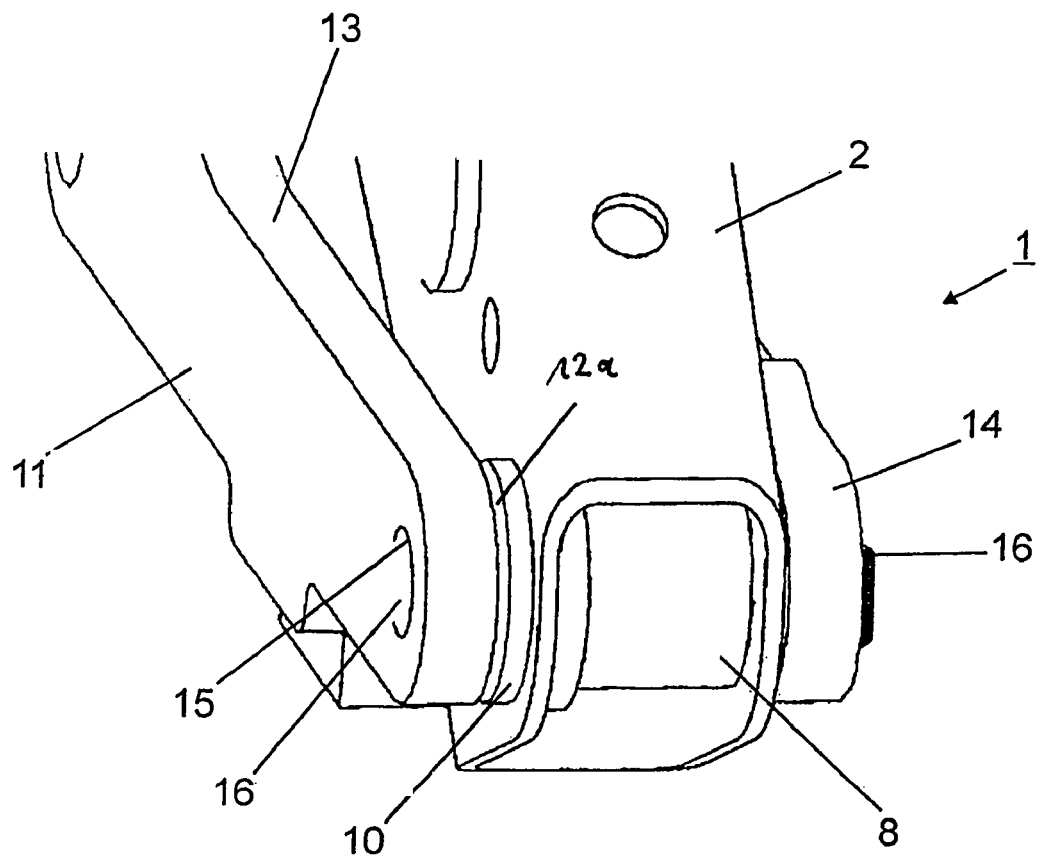
FIG. 7 shows a perspective view of a separate component retained in a rotatably mounted manner on the structural element shown in FIG. 5.
Figure 8:
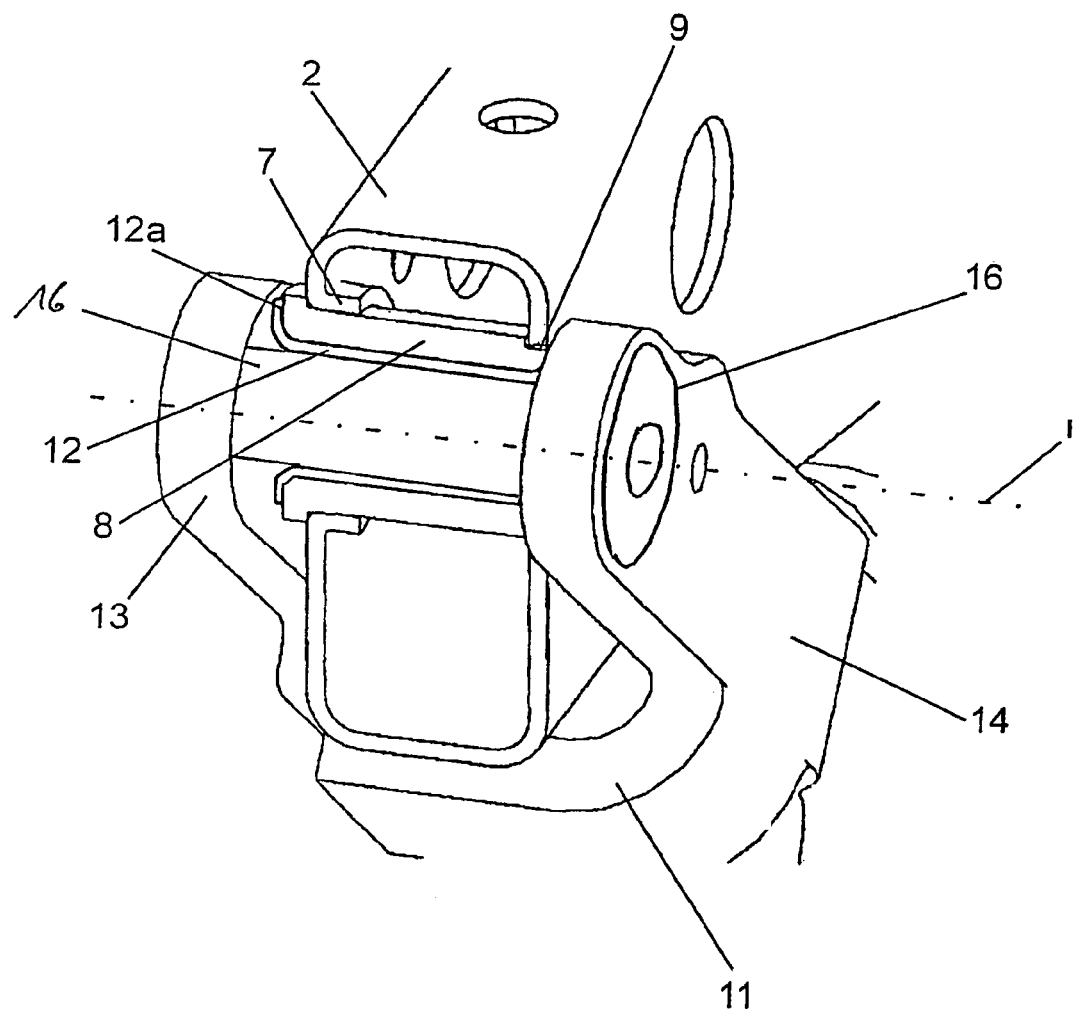
FIG. 8 shows a perspective sectional view through the individual elements of a bearing device when the component shown in FIG. 7 has been mounted thereon.

FIG. 7 and FIG. 8 each show a preferred embodiment of the present invention wherein the bearing device 1 is in a state where the separate component 11 has been mounted on the punching bushing 8 and/or on the structural element 2. The separate component 11 is designed as a link component and has a first link arm 13 and a second link arm 14. A respective through-hole 15 is formed at the free ends of the link arms 13, 14. A fastening element 16 in the form of a rivet is plugged through the through-holes 15 and passes through the sliding-bearing bushing 12 thereby. The partially broken away perspective view of FIG. 8 shows that an external diameter of the rivet 16 is adapted centrally to the internal diameter of the sliding-bearing bushing 12. The rivet 16, which is fixed to the two link arms 13, 14 in each case, is thus mounted in a radially play-free manner in the sliding-bearing bushing 12. Correspondingly, the component 11, which encloses the structural element 2 on both sides by way of its two link arms 13, 14, and the structural element 2 can be pivoted smoothly, and with only a low level of wear, relative to one another. The longitudinal axis 1 of the punching bushing 8 and a longitudinal axis of the rivet 16, respectively, here define a pivot axis for the component 11.

Instead of the rivet 16 shown, the fastening element which mounts the separate component 11 on the punching bushing 8 and/or on the structural element 2 may also be designed in the form of a screw, of a bolt or the like which is plugged through the hollow sliding-bearing bushing 12 and engages through the respective through-holes 15 in the link arms 13, 14, for example. In the region of the sliding-bearing bushing 12, the screw preferably has a smooth outer circumference in order to provide low-friction rotation relative to the sliding-bearing bushing 12.

In a further preferred embodiment of the present invention, the punching bushing may be provided with an internal thread on its end sides. A respective screw can be screwed into the internal thread from outside the structural element 2, these screws passing through the through-holes 15 in the first and second link arms 13, 14. Consequently, the separate component 11 is then mounted directly on the shank of the respective screw. There is no need here for any additional sliding-bearing bushing. Instead, a coating having a low coefficient of friction may be provided on the shank of the respective screw and/or on the inner surface of the through-holes 15, in order to provide low-wear and jamming-free pivoting of the component 11 in relation to the screws and/or the structural element 2.

In a further preferred embodiment of the bearing device according to the present invention, a separate component may be mounted between the first and the second wall regions. A sliding-bearing bushing in the form of a sleeve may be provided on the punching bushing here, in which case the separate component is in sliding contact with the sliding-bearing bushing and low-friction pivoting in relation to the structural element is thus possible.

The bearing device 1 according to a preferred embodiment of the present invention forms a pivot bearing for at least one separate component, e.g. in the form of a link component with two link arms 13, 14 located opposite one another. The bearing location in the form of a punching bushing 8 advantageously stiffens the structural element 2 with respect to its cross-section. In addition, there may be advantageous minimization of the surface pressure with respect of the first and second wall regions 3, 4, in particular in the case of thin-walled cross-sections, which makes it possible to use materials of relatively low compressive strength. By virtue of the punching bushing 8 being punched into the second wall region 4, the punching bushing 8 can be connected to the structural element 2 with a high level of accuracy and in a straight forward manner in production terms. Since there are no welding operations or the like required here, it also may be possible to dispense with additional corrosion-protection measures for the assembled bearing device according to a preferred embodiment of the present invention following the punching operation.

What is claimed is:

1. A bearing device comprising:
   an at least partially hollow structural element having a first wall region provided with an opening and a second wall region, the first and second wall regions being located opposite one another; and
   a punching bushing provided for bearing at least one separate component, the punching bushing comprising a rear end portion received in the opening of the first wall region, the punching bushing comprising a front end portion contacting the second wall region, the front end portion of the punching bushing comprising a punching blade for punching out an opening out of the second wall region; wherein the separate component is retained in a rotatably mounted manner on the punching bushing by means of a fastening element and is pivotable in relation to the structural element.

2. The device as claimed in claim 1 wherein the opening of the first wall region has a collar which guides the punching bushing along a longitudinal axis.

3. The device as claimed in claim 2 wherein the collar is formed on the inside of the first wall region.

4. The device as claimed in claim 1 wherein the first and second wall regions are separated from each other by a distance and the punching bushing bridges the distance.

5. The device as claimed in claim 1 wherein a longitudinal axis of the fastening element and/or the punching bushing defines a pivot axis for the separate component.

6. The device as claimed in claim 1 wherein the punching bushing is configured to be hollow along a longitudinal axis.

7. The device as claimed in claim 1 wherein the punching bushing is of essentially cylindrical configuration.

8. The device as claimed in claim 6 further comprising at least one sliding-bearing bushing having an essentially cylindrical inner surface received within a cavity of the punching bushing.

9. The device as claimed in claim 8 wherein the fastening element is fastened on the component and is mounted in a rotatable manner in the sliding-bearing bushing.

10. The device as claimed in claim 8 wherein the sliding-bearing bushing has a first peripheral region, the external diameter of the first peripheral region being larger than the internal diameter of the punching bushing.

11. The device as claimed in claim 9 wherein the sliding-bearing bushing can be introduced into the punching bushing from both sides respectively.

12. The device as claimed in claim 11 wherein the sliding-bearing bushing has a second peripheral region being opposite from the first peripheral region and having an external diameter being adapted to the internal diameter of the punching bushing, such that the sliding-bearing bushing can be inserted into the punching bushing by way of the second peripheral region.

13. The device as claimed in claim 12 wherein the second peripheral region projects out of the punching bushing and can be flanged once the sliding-bearing bushing has been introduced into the punching bushing.

14. The device as claimed in claim 1 wherein the fastening element is selected from the group consisting of a rivet, a screw and a bolt.

15. The device as claimed in claim 14 wherein the fastening element is provided on its outer circumferential surface with a coating having a low coefficient of friction.

16. The device as claimed in claim 1 wherein at least one end of the punching bushing has an internal thread into which a fastening element can be screwed from an outer side of the structural element, the separate component being mounted in a rotatable manner on the fastening element.

17. The device as claimed in claim 16 wherein the separate component comprises a throughhole through which the fastening element passes, wherein an outer circumferential region of the fastening element and/or at least part of an inner circumferential surface of the through-hole is coated with a material having a low coefficient of friction.

18. The device as claimed in claim 1 wherein the separate component is retained in a rotatably mounted manner on an outer side of the first wall region and/or of the second wall region.

19. The device as claimed in claim 18 wherein the separate component is a link component having two link arms, each link arm being retained in a rotatably mounted manner on an outer side of the first wall region and of the second wall region, respectively, such that the structural element is accommodated between the first wall region and the second wall region.

20. The device as claimed in claim 18 wherein a separate component is retained in a rotatably mounted manner on an outer side of the first wall region and of the second wall region, respectively.

21. The device as claimed in claim 1 wherein the separate component is mounted on the punching bushing between the first wall region and the second wall region.

22. The device as claimed in claim 21 wherein the sliding-bearing bushing is fitted onto an outer circumference of the punching bushing, the separate component being in sliding contact with the sliding-bearing bushing during pivoting with respect to the structural element.

* * * * *